United States Patent [19]

Wai-Ching

[11] Patent Number: 5,156,637
[45] Date of Patent: Oct. 20, 1992

[54] TOASTER

[76] Inventor: Yick Wai-Ching, P.O. Box 82-144, Taipei, Taiwan

[21] Appl. No.: 664,358

[22] Filed: Mar. 4, 1991

[51] Int. Cl.[5] ............................................. A47J 37/08
[52] U.S. Cl. ...................................... 99/388; 99/391; 99/402
[58] Field of Search ................. 99/388, 402, 339, 379, 99/391, 426, 351, 349

[56] References Cited

U.S. PATENT DOCUMENTS

| | | | |
|---|---|---|---|
| 475,884 | 5/1892 | Murrey | 99/402 |
| 1,712,474 | 5/1929 | Serrell | 99/402 |
| 1,892,117 | 12/1932 | Perkins | 99/388 |
| 2,147,388 | 2/1939 | Serota | 99/388 |
| 2,160,771 | 5/1939 | Wertzheiser | 99/388 |
| 2,483,669 | 10/1949 | Reid | 99/388 |
| 2,941,463 | 6/1960 | DiCuia | 99/402 |
| 3,046,870 | 7/1962 | Bork | 99/402 |
| 4,129,067 | 12/1978 | Reiland | 99/391 |
| 4,290,349 | 9/1981 | Fiorenza | 99/339 |
| 4,656,927 | 4/1987 | Mosby et al. | 99/388 |

Primary Examiner—Timothy F. Simone
Attorney, Agent, or Firm—Alfred Lei

[57] ABSTRACT

This invention relates to a toaster and in particular to one including a body portion, a holding mechanism, a linking mechanism and baking panels whereby the bread may be provided with brown pattern on the surface thereby stimulating one's appetite and increasing the additional value thereof.

1 Claim, 10 Drawing Sheets

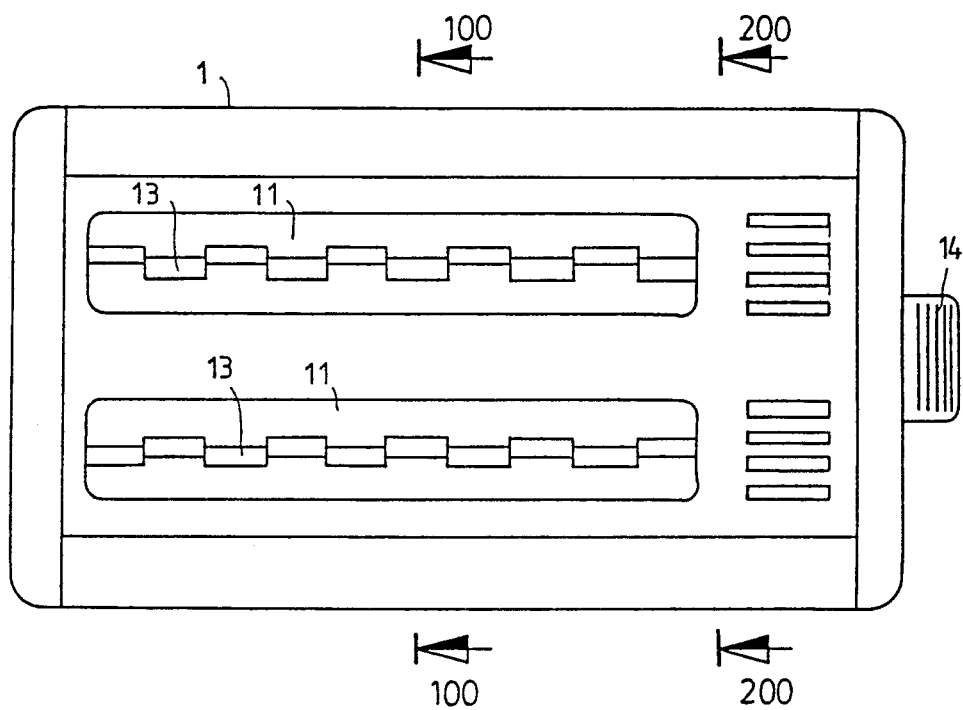
F I G. 3

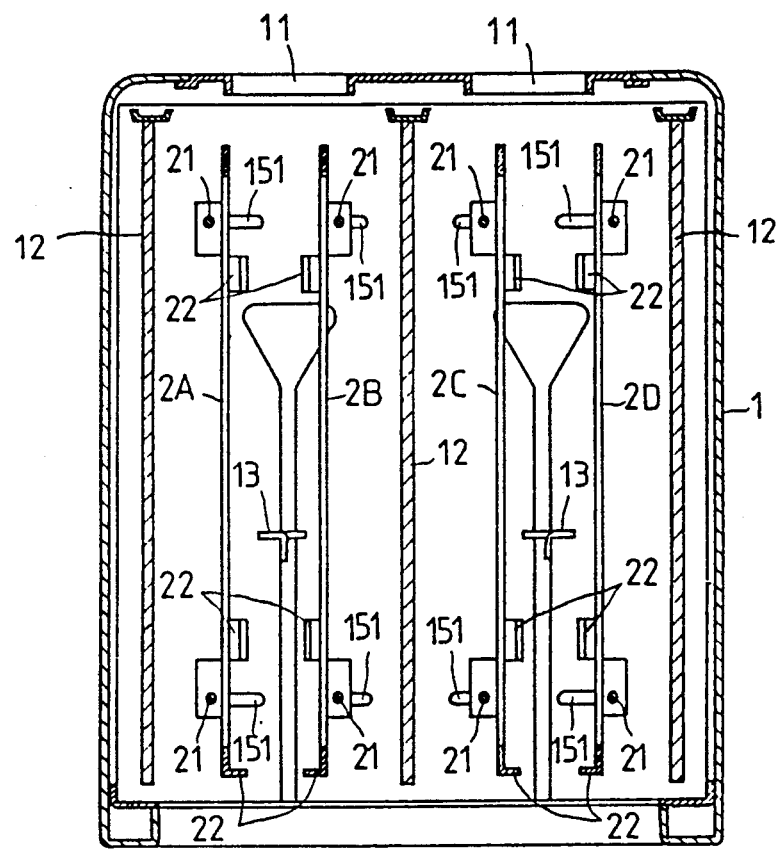
F I G. 4

5,156,637

TOASTER

BACKGROUND OF THE INVENTION

It is found that the prior art toaster is used to make the bread brown and crisp by heating. However, such break only has brown surfaces which is too monotonous.

Therefore, it is an object of the present invention to provide an improved toaster which may obviate and mitigate the above-mentioned drawback.

SUMMARY OF THE INVENTION

This invention relates to an improved toaster.

It is the primary object of the present invention to provide a toaster which may make a brown pattern on the bread.

It is another object of the present invention to provide a toaster which may stimulate one's appetite.

It is still another object of the present invention to provide a toaster which may increase the additional value of the bread.

It is still another object of the present invention to provide a toaster which is simple in construction.

It is still another object of the present invention to provide a toaster which is economic to produce.

Other objects and merits and a fuller understanding of the present invention will be obtained by those having ordinary skill in the art when the following detailed description of the preferred embodiment is read in conjunction with the accompanying drawings.

BRIEF DESCRIPTION OF THE DRAWINGS

FIG. 3 is a top plan view of the present invention;

FIG. 4 is a sectional view taken along line A—A of FIG. 3;

DETAILED DESCRIPTION OF THE PREFERRED EMBODIMENT

Figure 1:
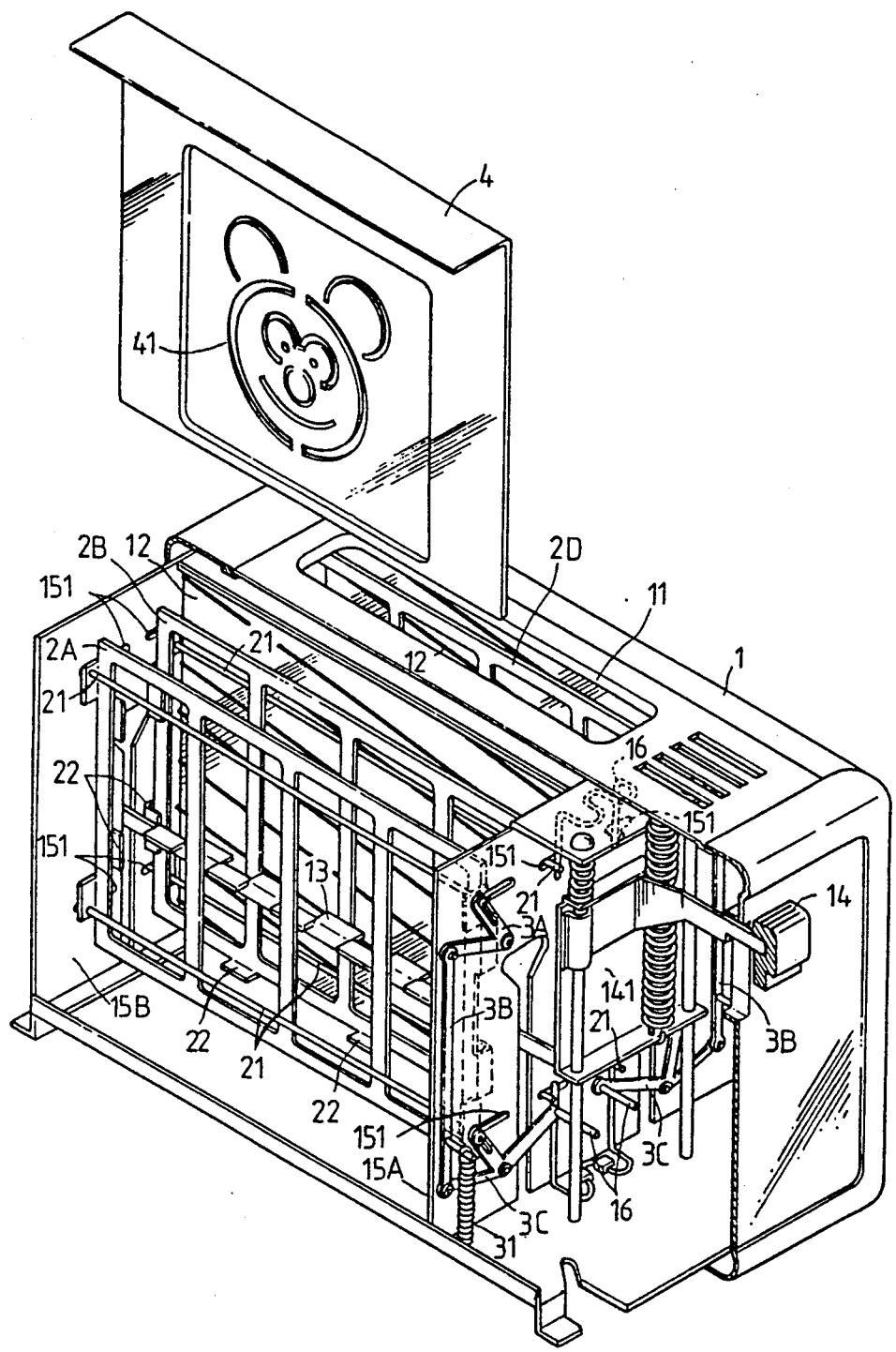
FIG. 1 is a perspective view showing the structure of a toaster according to the present invention.

With reference to the drawings and in particular to FIG. 1 thereof, the toaster according to the present invention mainly comprises a body portion, a holding mechanism, a linking mechanism and a toasting mould.

The body portion includes a housing 1 on which there are two bread slots 11, a heater 12, two supporting racks 13, a lift knob 14 and a timer (not shown). As the above-mentioned component parts are well known in the art, there is no need to describe them here in detail.

Figure 2:
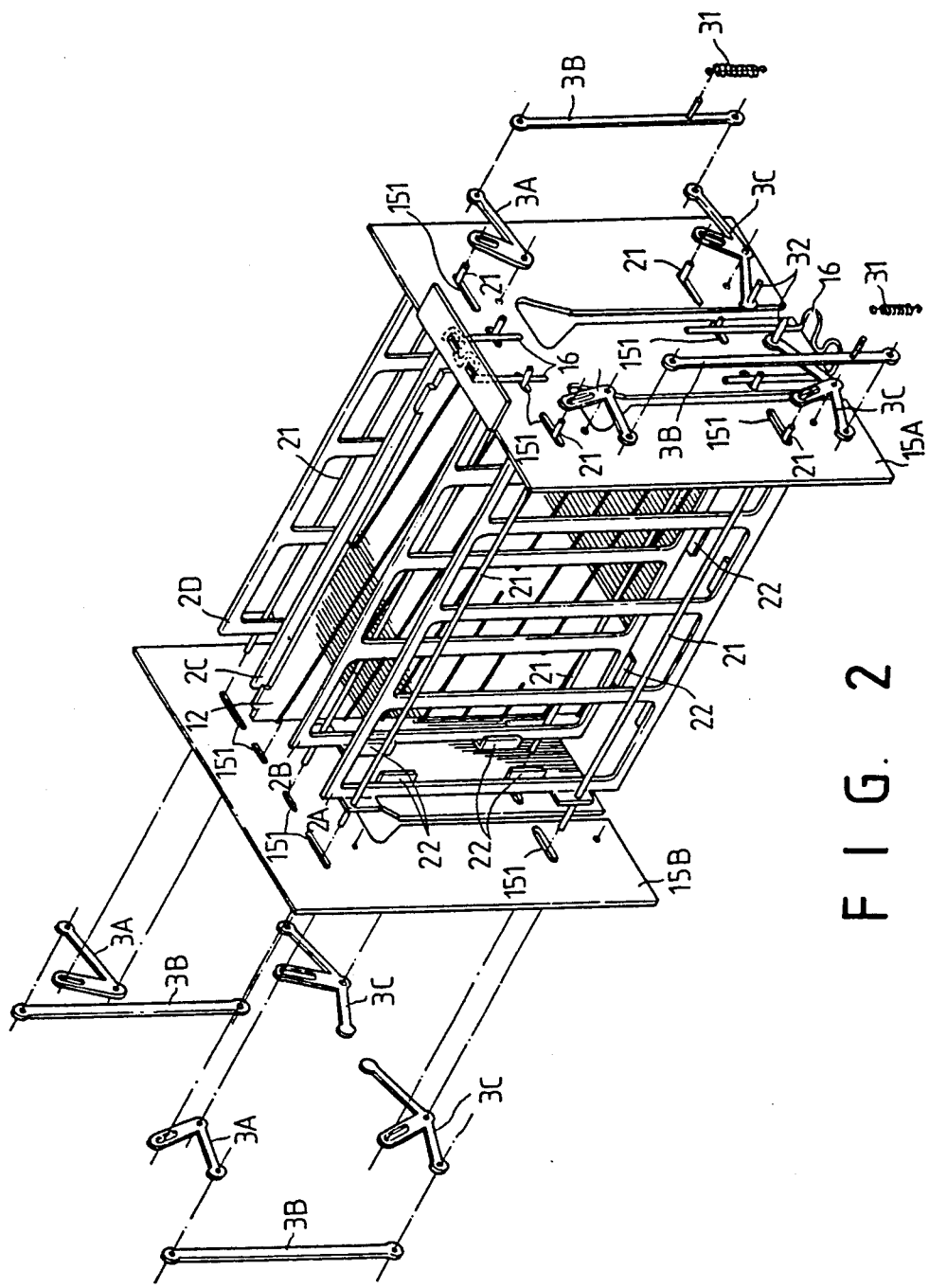
FIG. 2 shows the structure of the clamping mechanism and the linking mechanism according to the present invention.

Referring to FIGS. 2, 3, and 4, the holding mechanism is composed of four clamping frames 2A, 2B, 2C and 2D which are engaged with slots 151 of supporting plates 15A and 15B by means of transverse rods 21. The space between the clamping frames 2A and 2B and the space between the clamping frames 2C and 2D are just located under corresponding bread slots 11. The transverse rods 21 for fixing the clamping frames 2B and 2C are connected with a spring 16 so as to provide an appropriate springing space for the clamping frames 2B and 2C. The clamping frames 2A, 2B, 2C and 2D are provided at both vertical and bottom sides with L-shaped lugs 22 so that the bread may be received between the clamping frames 2A and 2B, and the clamping frames 2C and 2D.

Figure 5:
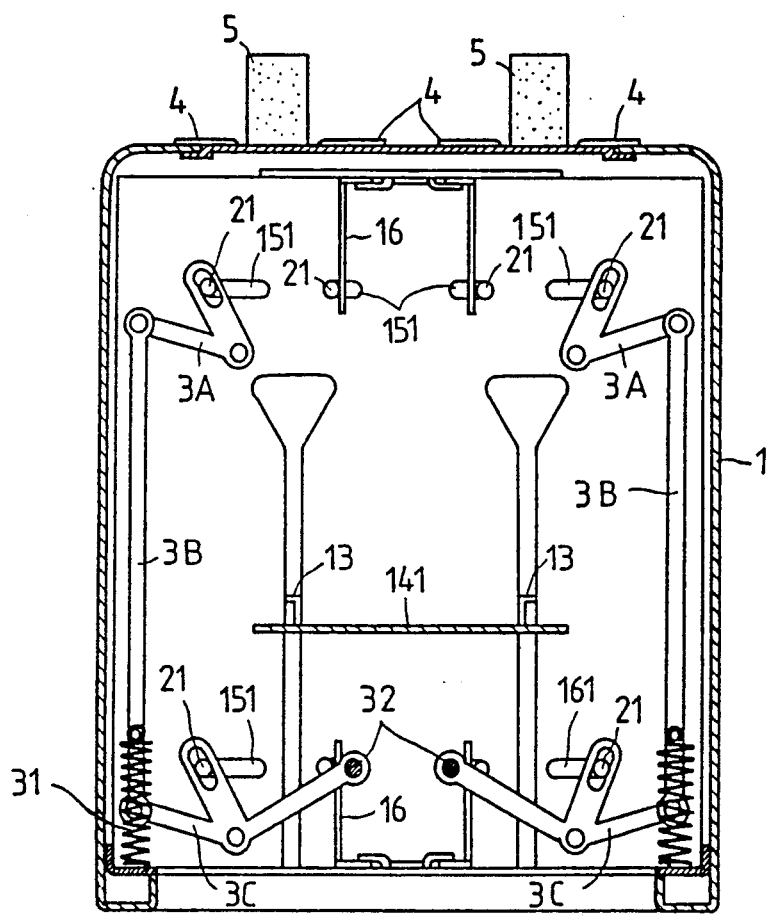
FIG. 5 is a sectional view taken along line B—B of FIG. 3.

Looking now at FIGS. 2, 3 and 5, the linking mechanism comprises connecting rods 3A, 3B and 3C, and both sides of the supporting plates 15A and 15B are provided with two linking mechamisms. The upper end of the connecting rod 3A is engaged with the rod 21 on the clamping frames 2A and 3D, while the other end thereof is connected with the upper end of the connecting rod 3B. Further, the connecting rod 3A is pivoted on the supporting plates 15A and 15B. The lower end of the connecting rod 3B is pivotally connected with an end of the connecting rod 3C and provided with a pull back spring 31. The upper end of the connecting rod 3C is engaged with the transverse rod 21 at the lower side of the clamping frames 2A and 2D. In addition, the connecting rod 3C has an arm 32 making an angle of 90 degrees with the middle arm of the connecting rod 3C. The arm 32 is locating under and activating plate 141 of the lift knob 14. As the lift knob 14 is pressed, the connecting rods 3A, 3B and 3C are driven to urge the clamping frames 2A and 2D inwards.

The baking panel 4 (see FIGS. 1 and 6) is a metal plate with a hollow pattern 41 and inserted between the clamping frames 2A, 2B and 2C, 2D and kept in position by the L-shaped lugs thereof.

Figure 6:
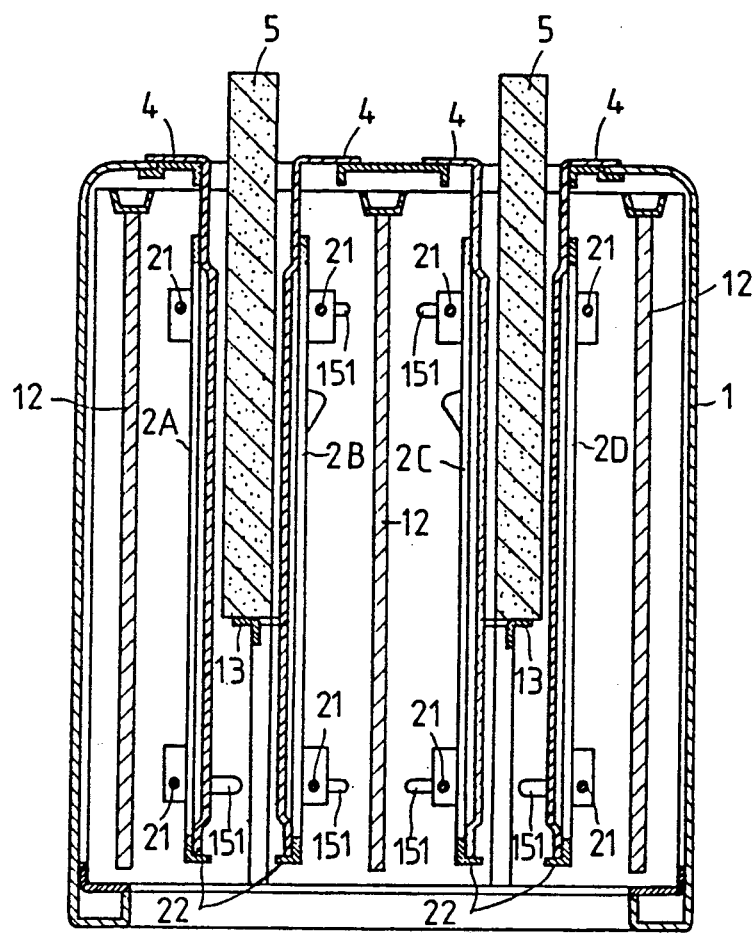
FIG. 6 shows the way to load bread into the present invention.
Figure 7:
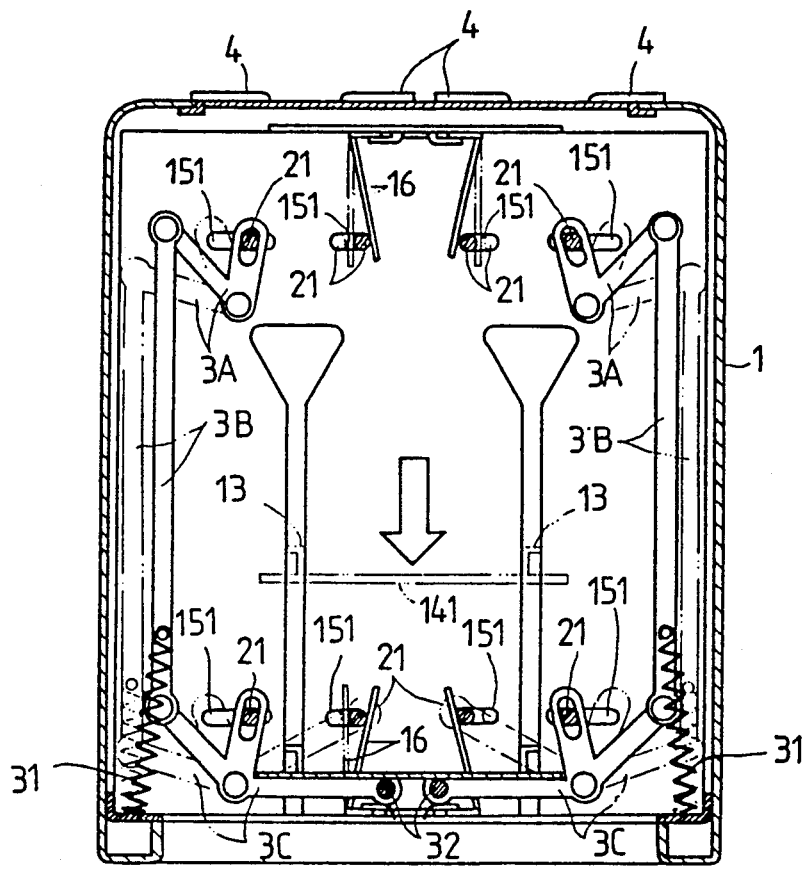
FIG. 7 shows the way how the linking mechanism works when the break is gripped by the clamping mechanism.
Figure 8:
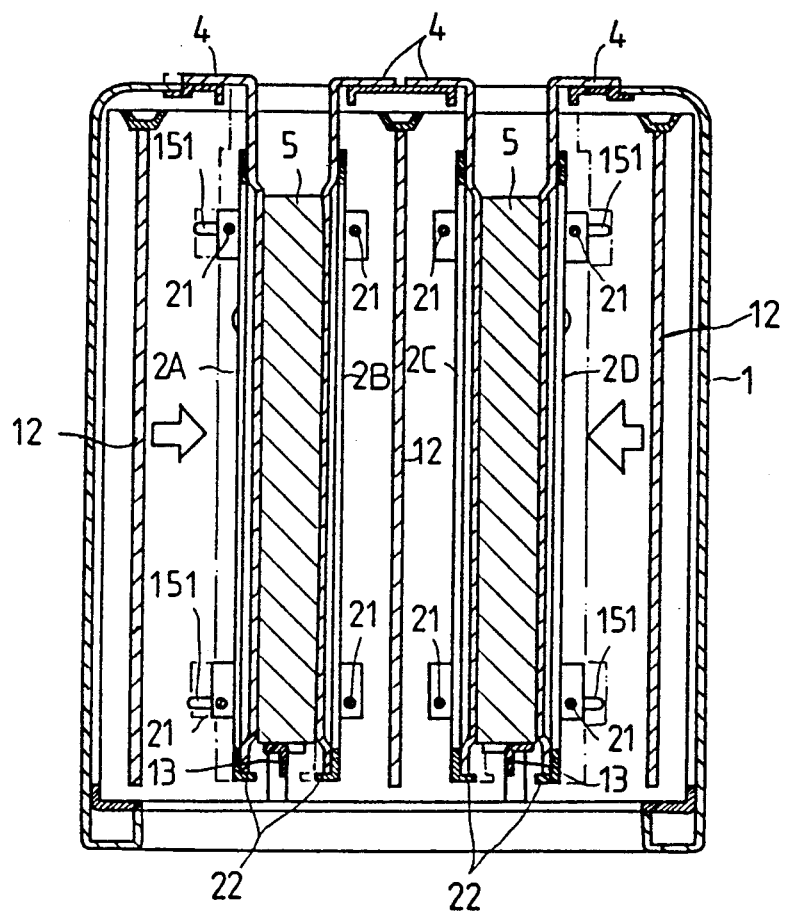
FIG. 8 shows the way how the bread is gripped by the clamping frames.

As shown in FIGS. 5 and 6, when in use, simply insert the bread into the slot 11 so that the lower edge of the bread is received by the supporting rack 13 and held in position by the clamping frames 2A, 2B and 2C, 2D. Then, press the lift knob 14 so that the connecting rods 3A, 3B and 3C will driven the clamping frames 2A and 2C to go inwards thereby urging the baking panel 4 on the bread and therefore making a brown pattern on the bread.

Figure 9:
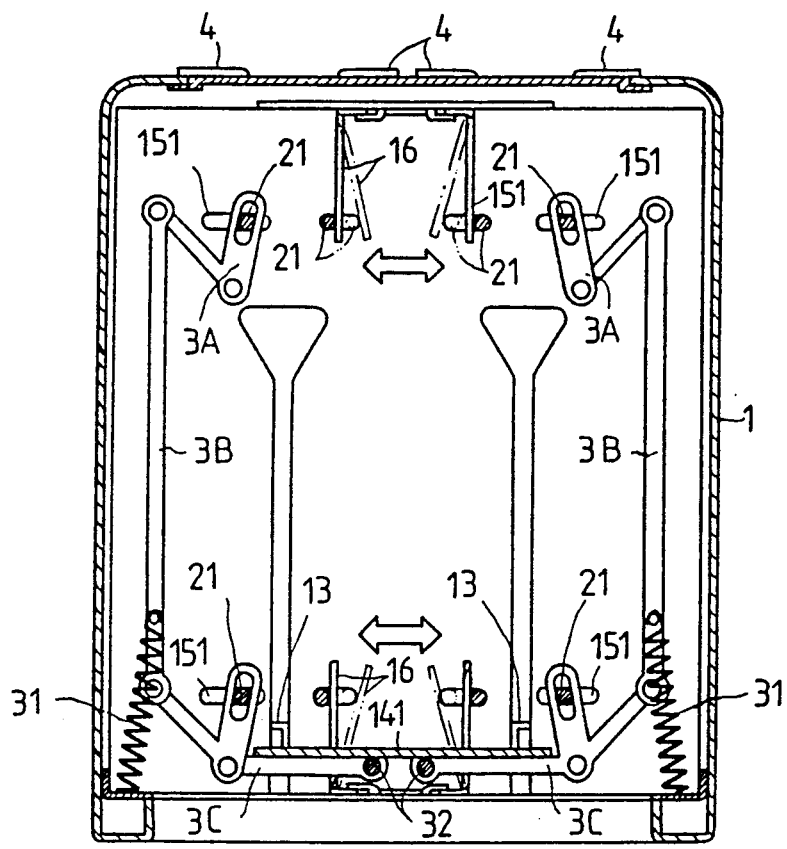
FIG. 9 shows the way how the spring works when the bread is dehydrated.
Figure 10:
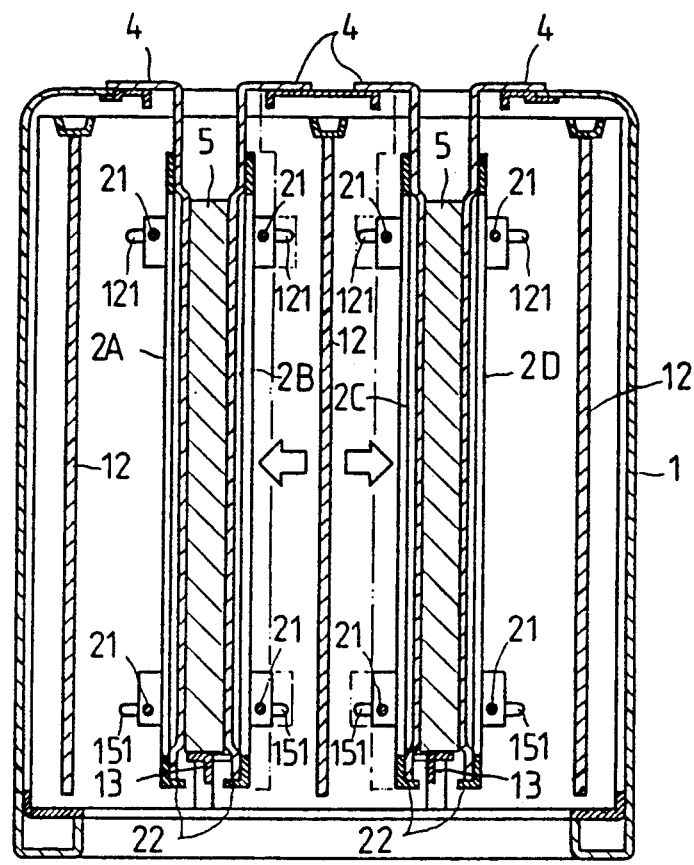
FIG. 10 shows the way how the clamping frames works when the bread is toasted and dehydrated.

Turning to FIGS. 9 and 10, when the bread is dehydrated, the width thereof will decrease and the clamping frames 2B, 2D will move outwards to grip the bread 5 thereby keeping the bread 5 in contact with the baking panel.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A toaster comprising:

a body portion being a housing on which there are two bread slots;

a holding mechanism mounted within said body portion and composed of four clamping frames which are engaged with elongated slots of supporting plates by means of upper and lower transverse rods, each of said clamping frames being provided at both vertical and bottom sides with L-shaped lugs, space enclosed by said clamping frames being just located under a corresponding one of said bread slots;

a linking mechanism comprising a first connecting rod, a second connecting rod and a third connecting rod, and both sides of said supporting plates being provided with two said linking mechanisms, an upper end of said first connecting rod being engaged with said transverse rod on said clamping frames and the other end thereof being connected with an upper end of said second connecting rod, said first connecting rod being pivoted on said supporting plates, a lower end of said second connecting rod being pivotally connected with an end of said third connecting rod at a lower side of said clamping frames, said third connecting rod having an arm making an angle of 90 degrees with a middle arm of said third connecting rod, said arm being located under an activating plate of a lift knob so that when said lift knob is pressed, said connecting rods are driven to urge said clamping frames inwards; and baking panels inserted between said clamping frames and kept in position by L-shaped lugs of said clamping frames.

* * * * *